Patented Sept. 30, 1952

2,612,477

UNITED STATES PATENT OFFICE 2,612,477

EMULSIFIER COMPOSITIONS

Reginald G. Mitchell, Brighton, Harold C. Tait, Teddington, William C. Webber, New Malden, Robert G. Aickin, Teddington, Philip A. Winsor, Great Sutton, and Albert V. Billinghame, Eltham, England, assignors to Shell Development Company, San Francisco, Calif., a corporation of Delaware No Drawing. Application March 27, 1946, Serial No. 657,630. In Great Britain March 29, 1945

14 Claims. (Cl. 252—308)

This invention relates to improved emulsifier compositions which may be used to produce soluble oil, gel, sol, paste, solution or droplet type emulsions suitable for a wide variety of industrial, insecticidal, fungicidal, pharmaceutical, veterinary and domestic purposes.

A very large number of emulsifiers have been suggested and a great many different emulsifying agents are in actual use. One class of emulsifiers which has proved to be especially advantageous is the so-called non-soapy detergents or synthetic wetting agents (as distinguished from fatty acid salts). The present invention relates to improved emulsifier compositions containing such emulsifiers, particularly the salts of hydrophilic water-soluble polar compounds, most preferably containing at least eight carbon atoms per molecule, having a —$SO_3H$ group in the molecule which may be directly linked to a carbon atom as in the sulfonic acids or may be attached to an oxygen atom which is directly linked to a carbon atom as in sulfuric acid esters. These salts will be generically referred to hereinafter as sulfonate salts.

It has been proposed to employ such sulfonate salts in combination with other agents, especially hydroxy compounds, such as alcohols, alcohol amines, hydroxy esters, hydroxy ethers, etc. According to the present invention, however, improved emulsifier compositions have particularly advantageous properties when produced by using water-soluble emulsifying agents having at least eight carbon atoms, particularly eight to twenty carbon atoms, per molecule and containing a hydrophilic group of the class consisting of sulfonic acid and sulfuric ester salt groups in combination with an amine free from alcoholic hydroxy groups but containing at least one alicyclic hydrocarbon radical of at least 6 carbon atoms in the molecule, particularly alcoholic hydroxy-free amines having a naphthenic radical. The amines thus defined include not only the free amines but also amine salts which may, for instance, be naphthenic acid salts of non-hydroxy amines which may or may not themselves also contain the specified alicyclic radical and may therefore be generically referred to as alcoholic hydroxy-free amine alicyclic compounds of which the preferred species is the corresponding amine naphthenic compounds.

The new combination emulsifer of the invention has unique and unexpected properties which make it particularly advantageous. For example, aqueous emulsions prepared with the aid of these emulsifier compositions possess improved properties with regard to temperature-stability, stability to electrolytes, and wetting and penetrating properties. In sharp contrast with emulsifiers prepared from the same sulfonic acid or sulfuric acid ester salts and hydroxy compounds such as alcohols or alcohol amines or alcohol amine salts, for instance, the compositions of the invention comprising alicyclic amines or amine salts free from alcoholic hydroxy groups are capable of producing clear sols with a wide variety of organic liquids which can be readily made either water-dispersible or solvent-dispersible. This gives the new compositions advantages in numerous applications and makes them suitable for many special purposes for which other emulsifiers are not well adapted.

The new emulsifier compositions may, for example, be advantageously used for the preparation of droplet emulsions. Emulsions of this type may readily be prepared from appropriate sols, gels, concentrated pastes or creams containing the chosen sulfonic acid salt or sulfuric ester salt, together with a hydroxy-free alicyclic amine compound by dilution with a solvent (to obtain a water-in-oil emulsion) or with water (giving an oil-in-water emulsion) or by direct emulsification of a dilute solution of a suitable naphthenic derivative in the requisite solvent with a dilute aqueous solution of an alkyl sulfuric acid salt. For promoting emulsification in the latter way, derivatives of naphthenic acids containing basic amine groups—either free or as their salts with organic acids—are particularly effective.

Thus, when 1 vol. of mineral white oil is vigorously shaken with 4 vols. of an aqueous solution containing 0.5% sodium $C_{10}$–$C_{18}$ secondary alkyl sulfates (i. e. a mixture of the sodium salts of secondary alkyl sulfates containing from ten to eighteen carbon atoms) and 0.15% $Na_2SO_4$ or with 4 vols. of an aqueous solution containing 0.5% of sodium lauryl sulfate and 0.06% $Na_2SO_4$, only poor emulsification results.

When the secondary alkyl sulfates are used, this emulsification is greatly enhanced by addition to the oil phase of 0.3% to 2.5% of beta-amino-ethoxy derivatives of the substituted cycloalkane, the latter comprising essentially the hydrocarbon part of naphthenic acids, hereinafter referred to as beta-amino-ethoxy naphthene, or of 0.08% to 0.3% of $C_{16}$–$C_{18}$ amines naphthenate (i. e. a mixture of naphthenates of primary straight chain amines containing sixteen to eighteen carbon atoms in the molecule).

Using sodium lauryl sulfate, naphthenic amines, beta-amino-ethoxy naphthene, naphthenic amine acetate, beta-amino-ethoxy naphthene naphthenate, $C_{16}$–$C_{18}$ amines naphthenate all give marked promotion of emulsification when added to the oil phase in 0.05% to 2.5% concentration, the degree of promotion of emulsification diminishing with increasing dilution of the added derivative. Naphthenic acid amides promote emulsification under the above conditions only about $\frac{1}{16}$ as effectively as the corresponding amines.

With sodium lauryl sulfate the various amines and their salts mentioned are considerably more effective than cholesterol when both are at concentrations below 0.5%.

Soluble oils and gels may be readily prepared from the new emulsifier compositions due to their unique characteristics. Thus, for example, when an alcoholic hydroxy-free amine naphthenic compound is gradually added to a mixture of a solvent and an equal volume of an aqueous solution of a surface-active sulfuric acid ester salt or sulfonic acid salt, the following stages are, in general, passed through at room temperature:

(1) When the solvent (say petroleum) and aqueous solution (for instance, containing 22.2% by weight of the sodium salts of $C_{10}$–$C_{18}$ secondary monoalkyl esters of sulfuric acid,[1] hereinafter referred to as "ester salts" for the sake of brevity) are mixed and then allowed to stand, the solvent (if of SG<1) separates as an upper layer containing more or less emulsified "ester salts." The remaining "ester salts" separates as an almost clear lower layer. In general, the volumes of the two layers are not quite equal owing to a small amount of mutual solubility.

(2) When a little of an alcoholic hydroxy-free amine naphthenic compound (say naphthenic amines) is added to (1) and the mixture shaken and allowed to stand, it is found that the lower layer has increased at the expense of the upper. Addition of the naphthenic amine causes increased solubilization of the solvent in the "ester salts" layer.

(3) With further addition of naphthenic amine this process reaches completion and the mixture becomes a homogeneous sol $S_1$.

(4) With further addition of naphthenic amine, the sol $S_1$ persists for a while until a renewed haziness or heterogeneity appears.

(5) Further addition of the naphthenic amine usually causes the mixture to clear again giving a clear gel G.

---
[1] Also containing 6.6% of sodium sulfate and 0.8% of polymers of the starting olefins from which the ester-salts were derived.

(6) More naphthenic amine causes the breakdown of the clear gel G giving a hazy liquid.

(7) This passes on further addition of naphthenic amine into a second clear sol $S_2$.

(8) With further addition of naphthenic amine the sol $S_2$ persists for a while until heterogeneity reappears with precipitation of a lower aqueous layer.

(9) This precipitation increases on further addition of amine naphthenic compound.

All the above processes appear to be readily reversible and equilibrium to be established rapidly. The sols $S_1$ and $S_2$ are not miscible with one another, heterogeneity between (3) and (7) being caused by the co-existence of these sols and the gel G. Alterations in temperature or in the relative proportions and nature of a system solubilized with "ester salts" and an alcoholic hydroxy-free amine naphthenic compound all affect the progress of the above changes (1) to (9). In some cases certain stages may be telescoped causing the disappearance of an intermediate stage.

In general, the most outstanding points in the solubilizing process of a particular mixture of "ester salts" and organic liquid by gradual addition of an alcoholic hydroxy-free amine naphthenic compound are:

(3) When the first clear sol $S_1$ first appears.
(4) When the homogeneity of the first sol $S_1$ is first destroyed.
(7) When the second clear sol $S_2$ first appears.
(8) When the homogeneity of the second clear sol $S_2$ is first destroyed.

For a given mixture of solvent and "ester salts" these points serve to compare the effectiveness of different agents as solubilizers. Such comparisons are made in the tables which follow.

The characteristics of the two sols $S_1$ and $S_2$ produced from a given mixture of "ester salts" and solvent by a particular alcoholic hydroxy-free amine compound can be seen by reference to the tables of results given hereinafter.

In most cases sol $S_1$ is dispersible in water and not in solvent. In this respect sol $S_1$ behaves as an oil-in-water emulsion. The behavior of sol $S_2$ is somewhat less regular but with hydroxy-free amines or amine soaps, sol $S_2$ is more frequently a solvent dispersible sol, i. e. it readily gives a water-in-oil emulsion on mixing with excess solvent but does not disperse readily in water. Some cases also arise in which either sol $S_1$ or sol $S_2$ may be dispersible in both oil and water.

TABLE I

[Formation of sols from 25 ccs. of petroleum ether and 25 ccs. of "ester salts."]

w=water-dispersible sol
s=petroleum-dispersible sol
ws=sol dispersible in water or petroleum

| Alcoholic Hydroxy-Free Amine Naphthenic Derivative added | Amount of Hydroxy-Free Amine Compound | | | |
|---|---|---|---|---|
| | Minimum to Produce First Clear Sol | Which Produces Inhomogeneity in First Sol | Minimum to Produce Second Clear Sol | Which Produces Inhomogeneity in Second Sol |
| Naphthenic amines _____ (cc.) __ | 1.2w | 1.5 | 2.3s | 2.8 |
| Beta-amino-ethoxy naphthene (cc.) __ | 1.5w | 1.8 | 3.5s | 4.8 |
| Naphthenic amine naphthenate (cc.) __ | 1.5ws | 1.7 | 2.0ws | 2.8 |
| Beta-amino-ethoxy-naphthene naphthenate _____ (cc.) __ | 1.5w | 2.0 | 4.0s | .5 |
| Cyclohexylamine naphthenate (g.) __ | 1.8w | 2.8 | 3.0s | 4.0 |
| Naphthenic amine oleate _____ (cc.) __ | | | 1.5ws | 3 |
| Naphthenic amine hydrochloride ___ | .50w | .55 | .90s | 1.0 |
| Naphthenic amine acetate _____ (cc.) __ | .55w | .59 | .92s | 1.0 |

TABLE II

[Formation of sols from 25 ccs. of xylol and 25 ccs. of "ester salts."]

w = water-dispersible sol
s = xylol-dispersible sol
ws = sol dispersible in water or xylol

| Alcoholic Hydroxy-Free Amine Naphthenic Derivative added | Amount of Hydroxy-Free Amine Compound | | | |
|---|---|---|---|---|
| | Minimum to Produce First Clear Sol | Which Produces Inhomogeneity in First Sol | Minimum to Produce Second Clear Sol | Which Produces Inhomogeneity in Second Sol |
| Naphthenic amines _____ (cc.) | 1.0w | 1.3 | 2.3s | 2.5 |
| Beta-amino-ethoxy-naphthene (cc.) | 1.3w | 1.8 | 2.8s | 3.8 |
| Naphthenic amine naphthenate (cc.) | 1.0ws | 1.3 | 2.0s | 2.3 |
| Beta-amino-ethoxy-naphthene naphthenate _____ (cc.) | 1.5w | 2.0 | 3.0s | 3.5 |
| $C_{16-18}$ amine naphthenate ____ (cc.) | 1.5w | 2.0 | 3.3s | 4.0 |
| Cyclohexylamine naphthenate (gms.) | 1.15w | 1.7 | 2.0s | 2.8 |
| Naphthenic amine oleate _____ (cc.) | 1.0ws | 1.3 | 2.0s | 2.5 |
| Naphthenic amine acetate __ (gms.) | .41w | .46 | .80s | .87 |

TABLE III

[Formation of sols from 25 ccs. of $CCl_4$ and 25 ccs. of "ester salts."]

w = water-dispersible sol
s = $CCl_4$-dispersible sol
ws = sol dispersible in water or $CCl_4$

| Alcoholic Hydroxy-Free Amine Naphthenic Derivative added | Amount of Hydroxy-Free Amine Compound | | | |
|---|---|---|---|---|
| | Minimum to Produce First Clear Sol | Which Produces Inhomogeneity in First Sol | Minimum to Produce Second Clear Sol | Which Produces Inhomogeneity in Second Sol |
| Naphthenic amines _____ (cc.) | .85w | 1.5 | 2.0s | 2.5 |
| Beta-amino-ethoxy-naphthene (cc.) | .8w | 1.3 | 1.8s | 3.3 |
| Naphthenic amine naphthenate (cc.) | -------- | -------- | 1.5s | 1.7 |
| Beta-amino-ethoxy-naphthene naphthenate _____ (cc.) | 1.0w | 1.5 | 2.5s | 3.0 |
| $C_{16-18}$ Amine naphthenate ____ (cc.) | 1.3w | 1.5 | 1.8s | 3.0 |
| Naphthenic amine oleate _____ (cc.) | -------- | -------- | 1.3s | 1.4 |
| Naphthenic amine acetate __ (gms.) | .26w | .30 | .67s | .73 |

TABLE IV

[Formation of sols from 25 ccs. of Pool Oil No. 31[1] and 25 ccs. of "ester salts."]

w = water-dispersible sol
s = sol dispersible in Pool Oil No. 31
ws = sol dispersible in water or Pool Oil No. 31

| Alcoholic Hydroxy-Free Amine Naphthenic Derivative added | Amount of Hydroxy-Free Amine Compound | | | |
|---|---|---|---|---|
| | Minimum to Produce First Clear Sol | Which Produces Inhomogeneity in First Sol | Minimum to Produce Second Clear Sol | Which Produces Inhomogeneity in Second Sol |
| Naphthenic amines _____ (cc.) | 2.5s | 3.0 | 3.3s | 4.0 |
| Beta-amino-ethoxy-naphthene (cc.) | 4.3w | 4.5 | 5.0ws | 7.3 |
| Beta-amino-ethoxy-naphthene naphthenate _____ (cc.) | -------- | -------- | 4.0ws | 5.5 |
| Naphthenic amine oleate _____ (cc.) | 3.0ws | 3.3 | 4.0ws | 5 |
| Naphthenic amine acetate __ (gms.) | -------- | -------- | 1.18s | 1.42 |
| Naphthenic amine hydrochloride | -------- | -------- | 1.08s | 1.32 |

[1] White oil with viscosity 83 sec. Saybolt at 100° Fahrenheit.

From the results given in Tables I, II, III and IV it is not to be thought that the relative volumes of solvent and "ester salts" that may be converted to sols or gels by addition of a naphthenic acid derivative are limited to 1:1 or thereabouts. This ratio can be varied widely and the concentrations of sodium secondary alkyl sulfate and sodium sulfate can also be varied to suit the particular case in hand.

The following table illustrates the formation of soluble oils from 2 volumes of solvent and 1 volume of "ester salts." The lettering has the same significance as in the earlier tables.

TABLE V

[Sol formation from 25 ccs. of "ester salts" and 50 ccs. of solvent and naphthenic amines.]

| Solvent | cc. Naphthenic Amine Added | | | |
|---|---|---|---|---|
| | Minimum to Produce First Clear Sol | Which Produces Inhomogeneity In First Sol | Minimum to Produce Second Clear Sol | Which Produces Inhomogeneity in Second Sol |
| Petroleum Ether (80–100) | | | 3.0s | 3.2 |
| Xylol | 1.8w | 2.5 | 2.8s | 3.3 |
| CCl₄ | 2.3ws | 3.0 | 3.3s | 3.5 |
| Highly refined mineral oil | | | 3.5s | 4.2 |

These results may be contrasted with those obtained by the use of "ester salts" or sulfonic acid salt dispersing agents with hydroxy naphthenic compounds as may be seen from the following data obtained under exactly the same conditions.

TABLE VI

[Formation of sols from 25 ccs. of solvent and 25 ccs. of "ester salts" with various hydroxy naphthenic and similar compounds]

w=water-dispersible sol

| Hydroxy Naphthenic Compound | Amount of Hydroxy Naphthenic Compound | | | |
|---|---|---|---|---|
| | Minimum to Produce First Clear Sol | Which Produces Inhomogeneity in First Sol | Minimum to Produce Second Clear Sol | Which Produces Inhomogeneity in Second Sol |
| Solvent=Petroleum Ether: | | | | |
| Naphthenic acids (cc.) | 1.0w | 1.2 | 1.9w | 3.4 |
| Naphthenic alcohols (cc.) | 1.2w | 1.5 | 2.6w | 3.4 |
| Glycol-mono-naphthenate (cc.) | 6.5w | 8.0 | 13 w | |
| Triethanolamine naphthenate (g.) | 7.5w | | | |
| Mono-ethanolamine naphthenate (g.) | 6.3w | | | |
| Solvent=Xyol: | | | | |
| Naphthenic acids (cc.) | 1.4w | 1.8 | 2.2w | 4.0 |
| Naphthenic alcohols (cc.) | 1.4w | | 3.7w | 5.2 |
| Glycol-mono-naphthenate (cc.) | 9.0w | >20 | | |
| Solvent=Carbon Tetrachloride: | | | | |
| Naphthenic acids (cc.) | 2.1w | 3.5 | 6.5w | 8.5 |
| Naphthenic alcohols (cc.) | .9w | 1.3 | | |
| Glycol-mono-naphthenate (cc.) | 4.0w | 6.0 | 12.5w | |
| Naphthenic acid amides (cc.) | 1.1w | 2.2 | 3.2w | 5.4 |
| Solvent=Pool Oil No. 31: | | | | |
| Naphthenic acids (cc.) | 2.9w | | | 5.0 |
| Naphthenic alcohols (cc.) | 3.7w | | | 5.8 |

When a suitable alcoholic hydroxy-free amine naphthenic derivative is added to a mixture of equal volumes of an organic solvent and a solution of a primary alkyl sulfate salt, for example an aqueous solution of sodium lauryl sulfate (containing 23.5% by weight of sodium lauryl sulfate and 2.9% of sodium sulfate), changes of the same type as those observed using an organic solvent and "ester salts" (see Tables I–V) occur. However, it is somewhat more difficult to obtain clear soluble oils making use of sodium lauryl sulfate. Many of the sols obtained possess a turbidity, but these may frequently be clarified by standing or centrifuging, thus causing the separation of a small amount of material from residual clear sol. Thus, 10 vols. of a solution containing 23.5% of sodium lauryl sulfate and 2.9% of sodium sulfate when mixed with 10 vols. of petroleum ether, xylol or carbon tetrachloride give hazy solvent-dispersible sols on addition of 1 to 1.5 vols. of naphthenic amines (B. P.=130° C. to 180° C. at 14 mm.). These sols may be clarified as described above. Instead of sodium lauryl sulfate, other salts of primary alkyl sulfates, for example, the sodium, potassium, ammonium, calcium, or other inorganic salts of decyl, undecyl, tridecyl, myrstyl, cetyl, stearyl, ceryl and like alcohols or the related unsaturated sulfate salts such as those from geraniol, oleyl alcohol and the like or salts of sulfate esters of cyclic alcohols such as cholesterol, p-isobutylphenyl ethanol, etc., may be used in the new emulsifier compositions of the invention with analogous results. Also, the corresponding phosphoric acid esters may be employed in the new compositions instead of the sulfuric acid esters described. Likewise, while the use of a mixture of sodium salts of secondary alkyl sulfates of ten to eighteen carbon atoms per molecule has been described in the foregoing examples, similar results may be obtained by using these alkyl sulfate salts individually or in the form of other ester salt mixtures, e. g. having 12 to 16 or 14 to 18 carbon atoms or the like. Potassium, ammonium, calcium, or other salts may be employed instead of the sodium salts. The preparation of alkyl acid sulfate salts suitable for use with alcoholic hydroxy-free amine alicyclic compounds, according to the present invention, is described, for example, in U. S. Patents 2,139,393 and 2,176,005.

While there are special advantages in the use of salts of alkyl esters of polybasic inorganic acids, particularly inorganic salts of secondary alkyl acid sulfates, in the new emulsifier compositions, nevertheless, as previously pointed out, the invention is not restricted thereto since improved emulsifiers may also be obtained by using alcoholic hydroxy-free amine alicyclic compounds in combination with hydrophilic surface-active sulfonic acid salts. Among the salts of this type which have been proved to be useful are, for instance, the oil-soluble petroleum sulfonate salts or mahogany soaps, sulfonated oils such as Turkey red oil, the sulfonated fatty alcohols, the sulfonaphthenates such as sulfonated naphthenic acid, the aromatic sulfonates, as the sulfonated alkylnaphthalenes, the sulfosuccinic acid ester salts, the arylalkyl sulfonates, e. g. the Twitchell reagents, sulfonated phenols, sulfolignin, sulfonated fatty acid amides, salts of isethionic acid or of taurine condensation products with higher fatty acids, etc. Thus, for example, advantageous emulsifier compositions consisting of sulfonated naphthenic acid sodium salts together with approximately half their weight of naphthenic amine are useful for the production of clear, stable, soluble, oil type emulsions. Sodium salts of petroleum oil-soluble sulfonates such as are obtained as a by-product of white oil manufacture in combination with about 20% to 80% of $C_{16-18}$ amine naphthenate or cyclohexylamine acetate, for instance, can be likewise used to produce solvent dispersible sols with a wide variety of solvents.

Mixtures of salts of sulfonic acids and salts of sulfuric acid esters may be used as the non-soapy detergent component of the new compositions. Complementary agents such, for example, as alcohols, preferably of at least 6 carbon atoms, most preferably of 6 to 8 carbon atoms, per molecule, hydroxy esters, alkyl substituted phenols such as petroleum or coal tar cresylic acids, polyhydric alcohols such as ethylene glycol, diethylene glycol, etc. and partial ethers or esters thereof, may also be present in the final emulsifier composition. The following examples illustrate the formulation of some typical compositions of this type.

*Example I*

30 parts by weight of the sodium salt of petroleum oil-soluble sulfonic acids is blended by heating with 40 parts by weight of an aqueous solution of the aforesaid sodium secondary alkyl sulfates containing 8 parts of active ingredients and 20% by weight of naphthenic amine is added to form a viscous translucent gel; 20 to 30 parts of a light petroleum distillate such as spindle oil previously heated to 50° C. is added slowly to the sulfonate/alkyl sulfate gel. On cooling to room temperature a stable viscous emulsion of paste consistency is obtained which is used as an emulsifier concentrate for soluble oils and droplet emulsions.

To 20 to 30 parts by weight of the above emulsifier concentrate heated to 30° C.–40° C., 80 to 70 parts of spindle oil is gradually added in a thin stream with continuous stirring; a stable viscous cream is obtained which disperses readily on agitation when added to water, forming stable aqueous dispersions. Alternatively, to obtain soluble oils the blend is heated to 100° C. to cause partial dehydration resulting in clarification and stability given clear amber-colored slouble oils dispersible on dilution with water forming relatively stable droplet emulsions.

*Example II*

A blend is prepared according to the method outlined in Example I but comprising 50/50% weight/volume mixture of the sodium salts of petroleum oil-soluble sulfonic acids and an aqueous solution of the aforesaid sodium secondary alkyl sulfates containing 11% of active ingredients. To 10 parts by weight of this blend is added 2 parts by weight of beta-amino-ethoxy naphthene and 2 parts by weight of the base oil. The blend is heated to form a clear dark viscous emulsifier. The requisite amount of oil (85 parts of light lubricating oil) previously heated to 40° C.–50° C. is added slowly to the heated emulsifier. In order to determine if the required emulsification properties have been obtained, water is added to the finished soluble oil in small amounts with stirring, and after small additions, portions are removed in order to obtain the required spontaneity of emulsification. Having ascertained the required amount of water necessary to give maximum emulsification properties, the final emulsifier base is prepared comprising:

Per cent by weight
Aqueous solution of the aforesaid sodium secondary alkyl sulfates_____ 33.5
Sodium salts of petroleum oil-soluble sulfonic acids_____ 33.5
Beta-amino-ethoxy naphthene_____ 13.5
Water _____ 15.0
Base oil (light lubricating oil, viscosity 50″ Redwood I at 140° F.)_____ 4.5

To 20 to 10 parts of the above emulsifier (heated) is added 80 to 90 parts of heated oil. Clear soluble oils with satisfactory slurry stability are thus obtained.

*Example III*

Equally satisfactory soluble oils may be prepared employing a non-soapy detergent which is a sodium primary alkyl sulfate. A base comprising a 30% aqueous solution (wt./vol.) of this detergent with the sodium salts of petroleum oil-soluble sulfonic acids is prepared according to the previous method as a 50% wt./vol. sodium salts of petroleum oil-soluble sulfonic acids/detergent base, employing naphthenic amine naphthenate as the non-hydroxy alicyclic amine compound; the composition of the finished emulsifier is as follows:

Per cent by weight
Aqueous solution of sodium primary alkyl sulfate (containing 2.8% active ingredients) _____ 30
Sodium salts of petroleum oil-soluble sulfonic acids _____ 30
Naphthenic amine naphthenate_____ 10
Water _____ 25
Base oil (light lubricating oil, viscosity 50″ Redwood I at 140° F.)_____ 5

Composition of finished soluble oil employing the above emulsifier at 20% weight:

Per cent weight
Aqueous solution of sodium primary alkyl sulfate _____ 6
Sodium salts of petroleum oil-soluble sulfonic acids _____ 6
Naphthenic amine naphthenate _____ 2
Water _____ 5
Light lubricating oil (viscosity 50″ Redwood I at 140° F.) _____ 81

*Example IV*

An emulsifier incorporating sodium primary and sodium secondary alkyl sulfates may be prepared as follows:

Per cent weight
Aqueous solution of sodium primary alkyl sulfate containing 2.8% active ingredients ___ 30
Sodium salts of petroleum oil-soluble sulfonic acids _____ 30
Aqueous solution of the aforesaid sodium secondary alkyl sulfates containing 3.37% active ingredients _____ 15
Beta-amino-ethoxy naphthene naphthenate _ 15
Base oil (light lubricating oil, viscosity 50″ Redwood I at 140° F.) _____ 10

Composition of finished soluble oil employing the above emulsifier at 20% weight:

| | Per cent weight |
|---|---|
| Aqueous solution of sodium primary alkyl sulfate | 6 |
| Sodium salts of petroleum oil-soluble sulfonic acids | 6 |
| Aqueous solution of sodium secondary alkyl sulfate | 3 |
| Beta-amino-ethoxy naphthene naphthenate | 3 |
| Light lubricating oil (viscosity 50″ Redwood I at 140° F.) | 82 |

Ethylene glycol or cresylic acid or methyl cyclohexanol may be added as a complementary agent in the emulsifier base, preferably in an amount corresponding to about 10% to 20% by weight of the base.

*Example V*

The use of various complementary agents, together with the emulsifier compositions of the invention, is shown in the following formulations:

(A)

| | Per cent weight |
|---|---|
| Aqueous solution of the aforesaid sodium secondary alkyl sulfates containing 8.8% active ingredients | 40 |
| Sodium salts of petroleum oil-soluble sulfonic acids | 20 |
| $C_{16-18}$ amine naphthenate | 20 |
| Cresylic acid or methyl cyclohexanol | 11.2 |
| Base oil (lubricating oil, viscosity 50″ Redwood I at 140° F.) | 8.8 |

(B)

| | Per cent weight |
|---|---|
| Aqueous solution of the aforesaid sodium secondary alkyl sulfates containing 8.8% active ingredients | 40 |
| Sodium salts of petroleum oil-soluble sulfonic acids | 20 |
| Naphthenic soaps (Na or K) | 12 |
| Naphthenic amine hydrochloride | 8 |
| Cresylic acid or methyl cyclohexanol | 11.2 |
| Base oil (lubricating oil, viscosity 50″ Redwood I at 140° F.) | 8.8 |

(C)

| | Per cent weight |
|---|---|
| Aqueous solution of the aforesaid sodium secondary alkyl sulfates containing 14.7% active ingredients | 67 |
| Sodium salts of petroleum oil-soluble sulfonic acids | 11.5 |
| Tall oil | 11.5 |
| Naphthenic amine acetate | 8.5 |
| Base oil (lubricating oil, viscosity 50″ Redwood I at 140° F.) | 1.5 |

(D)

| | Per cent weight |
|---|---|
| Aqueous solution of the aforesaid sodium secondary alkyl sulfates containing 8.8% active ingredients | 40 |
| Sodium salts of petroleum oil-soluble sulfonic acids | 20 |
| Cyclohexylamine naphthenate | 10 |
| Tall oil soaps (Na or K) | 12 |
| Cresylic acid or methyl cyclohexanol | 11.2 |
| Base oil (lubricating oil, viscosity 50″ Redwood I at 140° F.) | 6.8 |

*Example VI*

A 30% wt./vol. aqueous solution of a non-soapy detergent of the above type is prepared and blended with sodium salts of petroleum oil-soluble sulfonic acids, together with naphthenic soaps, unneutralized naphthenic acid and naphthenic amine in the following proportions:

| | Per cent weight |
|---|---|
| Oleic acid/Taurine condensation detergent type (Igepon T) | 30 |
| Sodium salts of petroleum oil-soluble sulfonic acids | 30 |
| Naphthenic soaps (Na or K) | 16 |
| Naphthenic acid | 12 |
| Naphthenic amine | 10 |
| Water | 2 |

The addition of 70–80 parts of light lubricating oil added slowly and with stirring to 30–20 parts of the above emulsifiers results in stable emulsifiable products which on addition to water spontaneously emulsify forming stable aqueous emulsions over a wide range of concentrations.

Compositions based on the foregoing formulations may be employed as emulsifiers for industrial purposes such as metal processing oils, cutting, grinding and anti-corrosion oils, or for horticultural purposes in conjunction with oil- or water-soluble toxic insecticidal, fungicidal, or bactericidal additions which may be added to either of the respective phases before formulation. Of oil-soluble toxic materials, pyrethrum, aliphatic or aromatic thiocyanates, para-dichlorodiphenyl trichlorethane (alpha,alpha-4.4′-dichlordiphenyl-beta,beta,beta - trichlorethane), derris, rotenone and dinitro-ortho-cresol are examples. Water-soluble bactericidal compounds such as formaldehyde or toxic insecticidal inorganic salts, for example, borax, may also be employed. Fungicidal compositions may include the heavy metal salts of fatty acids or of naphthenic acids dispersed in the oil phase and aqueous emulsions used for fabric treatment or wood preservation. In the preparation of products of the above type, lighter petroleum fractions may be employed to meet individual requirements. Gasoline, kerosene, white spirit or chlorinated hydrocarbons formulated as soluble oils, paste or cream emulsions on the above emulsifier compositions may be used as cleaning materials, for example, paint cleaners, aqueous or solvent degreasing compounds, polishes, with or without an abrasive material.

*Example VII*

Water-soluble compositions based on modifications of Example I may be prepared as follows:

7.7 parts by weight of naphthenic amine naphthenate is blended by heating with 61.5 parts by weight of an aqueous solution of the aforesaid sodium secondary alkyl sulfates. 30.8 parts of a concentrated oil-soluble insecticidal composition containing a mixture of isobutyl-undecylenamide and pyrethrum is added and the blend is heated to 25° C.–30° C. forming a clear stable soluble insecticidal concentrate. To 20 parts of this insecticide concentrate, 80 parts of water is added. A clear dilution as distinct from an aqueous emulsion of the droplet type is obtained, the final percentage composition being:

| | Per cent weight |
|---|---|
| Napthenic amine naphthenate | 1.54 |
| Aqueous sodium secondary alkyl sulfates containing 13.5% active ingredients | 12.3 |
| Pyrethrum concentrate | 6.16 |
| Water | 80.0 |

Example VIII

Other examples incorporating pyrethrum and an aliphatic thiocyanate insecticide are given below:

| | | | | |
|---|---|---|---|---|
| Naphthenic amine___per cent weight__ | 7.7 | 9 | 6 | 7 |
| Aqueous solution of the aforesaid sodium secondary alkyl sulfates containing at least 13% of active ingredients per cent weight__ | 61.5 | 66.5 | 65.5 | 73 |
| Pyrethrum concentrate (8% pyrethrins) per cent weight__ | 20.0 | 24.5 | 9.5 | |
| Alphatic thiocyanate__per cent weight__ | | | | 20 |
| Kerosene_____per cent weight__ | 10.8 | | 19.0 | |
| Finished insecticide containing approximately 3% vol. toxic materials__vols__ | 10 | 11 | 25 | 14 | made up to 100 vols. with water to give clear dilutions.

While the use of non-hydroxy primary amine alicyclic compounds has been emphasized in the foregoing examples, the invention is not restricted to the use of such primary compounds since improved results may also be obtained with the corresponding secondary or tertiary amine compounds. Thus, for example, instead of the naphthenic amines, naphthenic ethyl amines,

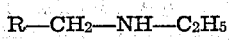

or naphthenic methyl ethyl amines,

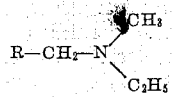

(R representing the hydrocarbon radical of a naphthenic acid from which the carboxyl group has been removed) may be employed in any of the foregoing mixtures. Another group of suitable non-hydroxy amine alicyclic compounds are, for instance, the naphthenic acid esters of hydroxy amines such as beta-amino-ethanol,

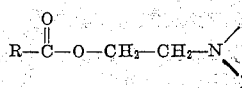

where $R^1$ and $R^2$ may be hydrogen or hydrocarbon groups, e. g. methyl, phenyl or cyclohexyl groups. More than one amine group may be present in the compound used as is the case with beta-aminoethyl naphthenic amines,

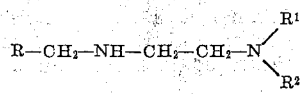

(where R, $R^1$ and $R^2$ have the same significance as in the preceding formulae), for instance. Salts of any of the foregoing may, of course, be used instead of the free amines themselves. Other salts which are suitable in the new compositions are, for example, the naphthenates of cyclohexyl methyl amine and of morpholine, and the like.

It will thus be seen that the invention offers many advantages and is capable of wide variation not only with respect to the non-fatty acid-salt emulsifying agents which may be used but also in regard to the amine compounds which may be employed therewith and the proportions in which these agents may be present in the new emulsifier compositions. It will therefore be understood that the invention is not restricted to the details given by way of example nor by any theory suggested in explanation of the improved results which are obtained.

We claim as our invention:

1. An emulsifier composition consisting essentially of a hydrophilic water-soluble polar inorganic salt of an organic acid containing a —SO₃H group and having an alkyl chain of 8 to 20 carbon atoms together with an amine alicyclic compound free from alcoholic hydroxy groups, water and an organic liquid incompletely miscible therewith in the proportions of about 5% to about 100% of said amine compound, based upon the weight of said inorganic salt, and about 2% to about 95% of water and about 1.5% to about 90% of said incompletely miscible organic liquid, based upon the total weight of the mixture.

2. An emulsifier composition consisting essentially of a hydrophilic water-soluble polar inorganic salt of an organic acid containing a —SO₃H group and having an alkyl chain of 10 to 18 carbon atoms together with 5% to 100% by weight, based upon the weight of said polar salt, of an amine which is free from alcoholic hydroxyl groups but contains a naphthenic hydrocarbon ring in the molecule, water and an organic liquid incompletely miscible therewith in the proportions of about 2% to about 95% of water and about 1.5% to about 90% of said incompletely miscible organic liquid, based upon the total weight of the mixture.

3. An emulsifier composition consisting essentially of an inorganic salt of an alkyl acid sulfate having 8 to 20 carbon atoms in the alkyl group together with an amine which is free from alcoholic hydroxyl groups but contains an alicyclic hydrocarbon ring of 6 carbon atoms in the molecule, water and an organic liquid incompletely miscible therewith in the proportions of about 5% to about 100% of said amine, based upon the weight of said salt, and about 2% to about 95% of water and about 1.5% to about 90% of said incompletely miscible organic liquid, based upon the total weight of the mixture.

4. An emulsifier composition consisting essentially of an inorganic salt of a secondary alkyl acid sulfate having 8 to 20 carbon atoms in the alkyl group together with an amine naphthenic compound free from alcoholic hydroxy groups, water and an organic liquid incompletely miscible therewith in the proportions of about 5% to about 100% of said amine compound, based upon the weight of said inorganic salt, and about 2% to about 95% of water and about 1.5% to about 90% of said incompletely miscible organic liquid, based upon the total weight of the mixture.

5. An emulsifier composition consisting essentially of a sodium salt of a secondary alkyl acid sulfate having 10 to 18 carbon atoms in the alkyl group together with a salt of an amino-substituted hydrocarbon, which amine salt is free from alcoholic hydroxy groups and contains an alicyclic ring of 6 carbon atoms, water and an organic liquid incompletely miscible therewith in the proportions of about 5% to about 100% of said amine salt, based upon the weight of said salt, and about 2% to about 95% of water and about 1.5% to about 90% of said incompletely miscible organic liquid, based upon the total weight of the mixture.

6. An emulsifier composition consisting essentially of a sodium salt of a secondary alkyl acid sulfate having 8 to 20 carbon atoms in the alkyl group together with a naphthenate of an amino-substituted hydrocarbon, water and an organic liquid incompletely miscible therewith in the proportions of about 5% to about 100% of said amine salt, based upon the weight of said salt, and about 2% to about 95% of water and about 1.5% to about 90% of said incompletely miscible organic liquid, based upon the total weight of the mixture.

7. An emulsifier composition consisting essentially of an inorganic salt of a sulfonic acid having an alkyl group of 8 to 20 carbon atoms together with a naphthenic amine, free from alcoholic hydroxy groups, water and an organic liquid incompletely miscible therewith in the proportions of about 5% to about 100% of said amine, based upon the weight of said salt, and about 2% to about 95% of water and about 1.5% to about 90% of said incompletely miscible organic liquid, based upon the total weight of the mixture.

8. A composition consisting essentially of a major amount of water, an organic liquid incompletely miscible therewith and sufficient of a mixture of a hydrophilic water-soluble polar inorganic salt of an organic acid containing a —SO$_3$H group and having an alkyl chain of 8 to 20 carbon atoms together with an amine alicyclic compound free from alcoholic hydroxy groups to form a stable fluid emulsion on addition of a further amount of one of said incompletely miscible components.

9. A dispersible sol consisting essentially of water, an organic liquid incompletely miscible therewith and a mixture of a hydrophilic water-soluble polar inorganic salt of an organic acid containing a —SO$_3$H group and having an alkyl chain of 10 to 18 carbon atoms together with a naphthenic amine free from alcoholic hydroxy groups, the proportions being such that said sol forms an emulsion of the water-in-oil type upon addition of a further amount of said organic liquid.

10. A dispersible sol consisting essentially of water, an organic liquid incompletely miscible therewith and a mixture of a sodium salt of a secondary alkyl acid sulfate having 8 to 20 carbon atoms in the alkyl group together with an amine which is free from alcoholic hydroxyl groups but contains an alicyclic hydrocarbon ring of six carbon atoms in the molecule, the proportions of the sol components being such that said sol forms an emulsion of the water-in-oil type upon addition of a further amount of said organic liquid.

11. A stable fluid emulsion of the oil-in-water type consisting essentially of a major amount of hydrocarbon in the liquid phase, water, a hydrophilic water-soluble polar inorganic salt of an organic acid containing a —SO$_3$H group and having an alkyl chain of 8 to 20 carbon atoms together with an amine alicyclic compound, free from alcoholic hydroxy groups, the proportion of water to hydrocarbon being sufficient to maintain the fluidity of the emulsion.

12. An emulsion consisting essentially of a continuous hydrocarbon phase which is the predominant component of the mixture and having dispersed therein water containing an inorganic salt of an alkyl acid sulfate having 10 to 18 carbon atoms in the alkyl group together with an amine which is free from alcoholic hydroxyl groups but contains an alicyclic hydrocarbon ring of 6 carbon atoms in the molecule, the proportion of water to hydrocarbon being sufficient to maintain the fluidity of the emulsion.

13. An emulsion consisting essentially of a continuous phase of water, an organic liquid incompletely miscible therewith and sufficient of a mixture of a sodium salt of a secondary alkyl sulfate of 8 to 20 carbon atoms per molecule and a naphthenate of an amino-substituted hydrocarbon, to maintain said incompletely miscible components in a uniformly dispersed condition.

14. A dispersible fluid sol consisting essentially of a mixture of 1 to 4 volumes of an aqueous solution of sodium salts of secondary alkyl sulfates of 10 to 18 carbon atoms per molecule with one volume of a liquid hydrocarbon and 0.3% to 10% by volume of said mixture of beta-aminoethoxy-naphthene such that the clear sol is spontaneously dispersible in said liquid hydrocarbon.

REGINALD G. MITCHELL.
HAROLD C. TAIT.
WILLIAM C. WEBBER.
ROBERT G. AICKIN.
PHILIP A. WINSOR.
ALBERT V. BILLINGHAME.

REFERENCES CITED

The following references are of record in the file of this patent:

UNITED STATES PATENTS

| Number | Name | Date |
|---|---|---|
| 2,052,164 | Buc | Aug. 25, 1936 |
| 2,088,020 | Wickert | July 27, 1937 |
| 2,139,276 | Lenher et al. | Dec. 6, 1938 |
| 2,230,556 | Zimmer et al. | Feb. 4, 1941 |
| 2,303,348 | Freeman et al. | Dec. 1, 1942 |
| 2,402,793 | White et al. | June 25, 1946 |